(12) United States Patent
Krotzek et al.

(10) Patent No.: US 8,133,941 B2
(45) Date of Patent: Mar. 13, 2012

(54) AQUEOUS EPOXY RESIN COMPOSITIONS

(75) Inventors: Alwin Krotzek, Werne (DE); Joerg Volle, Selm-Bork (DE)

(73) Assignee: Huntsman International LLC, The Woodlands, TX (US)

( * ) Notice: Subject to any disclaimer, the term of this patent is extended or adjusted under 35 U.S.C. 154(b) by 114 days.

(21) Appl. No.: 12/530,884

(22) PCT Filed: Mar. 4, 2008

(86) PCT No.: PCT/EP2008/052595
§ 371 (c)(1),
(2), (4) Date: Sep. 11, 2009

(87) PCT Pub. No.: WO2008/110479
PCT Pub. Date: Sep. 18, 2008

(65) Prior Publication Data
US 2010/0087568 A1  Apr. 8, 2010

(30) Foreign Application Priority Data
Mar. 15, 2007 (EP) ................................ 07104207

(51) Int. Cl.
*C08G 59/50* (2006.01)
*C08L 63/00* (2006.01)

(52) U.S. Cl. ........ 523/404; 523/402; 523/403; 523/414; 523/428

(58) Field of Classification Search .......... 523/402, 523/403, 404, 414, 420, 427, 428
See application file for complete search history.

(56) References Cited

U.S. PATENT DOCUMENTS

| | | | |
|---|---|---|---|
| 3,673,558 A | 6/1972 | Toepel et al. | |
| 4,116,900 A | 9/1978 | Belanger | |
| 4,197,389 A * | 4/1980 | Becker et al. | 523/420 |
| 4,304,700 A | 12/1981 | Shimp et al. | |
| 4,308,183 A | 12/1981 | Williams | |
| 4,399,242 A * | 8/1983 | Fowler et al. | 523/404 |
| 5,204,385 A | 4/1993 | Naderhoff | |
| 5,344,856 A * | 9/1994 | Klein | 523/403 |
| 5,369,152 A | 11/1994 | Naderhoff et al. | |
| 5,527,839 A * | 6/1996 | Walker | 523/404 |
| 5,539,023 A * | 7/1996 | Dreischhoff et al. | 523/404 |
| 5,591,812 A | 1/1997 | Starner | |
| 6,653,369 B2 * | 11/2003 | Gerlitz et al. | 523/404 |
| 7,300,963 B2 * | 11/2007 | Birnbrich et al. | 523/403 |
| 2004/0077802 A1 | 4/2004 | Scherzer et al. | |

FOREIGN PATENT DOCUMENTS

| | | |
|---|---|---|
| EP | 0024914 | 3/1981 |
| EP | 0488547 A2 * | 6/1992 |
| WO | WO 02074832 A1 * | 9/2002 |

OTHER PUBLICATIONS

Communication of a Notice of Opposition (Aug. 11, 2011).

* cited by examiner

*Primary Examiner* — Michael J Feely

(57) ABSTRACT

Curable, aqueous epoxy resin composition, comprising
a) an epoxy compound,
b) an aminic curing agent which is an aqueous solution of a product from the reaction between i) an adduct between a polyamine and a liquid glycidyl ether which is not a glycidyl ether of a polyalkylene glycol, and ii) an epoxidized polyalkylene glycol, and
c) from 0.5 to 15 wt.-%, based on the sum of the components b) and c), of a compound of the general formula (I)

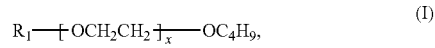

$$R_1 \text{---} [OCH_2CH_2]_x \text{---} OC_4H_9, \quad (I)$$

whereby
$R_1$=—H or —$C_4H_9$, and x=1, 2, 3 or 4,
providing due to the presence of component c) an adjustable and recognizable end of pot life during application, for example coating, adhesive, as flooring, casting, tooling or encapsulating.

9 Claims, No Drawings

AQUEOUS EPOXY RESIN COMPOSITIONS

CROSS REFERENCE TO RELATED APPLICATIONS

This application is the National Phase of International Application PCT/EP2008/052595 filed Mar. 4, 2008 which designated the U.S. and which claims priority to European (EP) Pat. App. No. 07104207.1 filed Mar. 15, 2007. The noted applications are incorporated herein by reference.

The invention relates to aqueous epoxy resin compositions.

In many application areas for epoxy resins the classic solvents are replaced by water. Advantages of this technology are a lesser ecological load and protection of resources.

The processability of said aqueous epoxy resin compositions and their properties in the cured state depends considerably from the chemistry and nature of the used curing agents.

From DE-PS 15 20 918 is known to use adducts of polyaminoamide as curing agents for aqueous epoxy resin dispersions. The obtained films excels with good elasticity and non-adhesive cure. A disadvantage of said adducts of polyaminoamide is the concurrent use of non-aqueous solvents, which limits the usability of these curing agents for thin films.

In DE-AS 19 25 941 are disclosed curing agents for aqueous epoxy resin dispersions, which are obtained from the reaction of amino amides with styroloxide or phenyl glycidyl ethers.

Moulds obtained according to DE-AS 19 25 941 show a strong tackiness and a poor water resistance.

According to DE-OS 25 49 656 water soluble curing agents can be obtained by mixing of an adduct of a polyamine diglycidyl ether with a mono epoxide adduct of a polyaminoamide and adding of acetic acid, whereby said curing agents leads after curing with epoxy resins to soft moulds which shows also inconsistent surfaces.

According to a further proposal of the prior art curing agents with aqueous epoxy dispersions are obtained (EP-A-0 000 605) from the reaction of a) a polyepoxy compound, b) a polyalkylene polyetherpolyol and c) a polyamine. The amine is present in a twice to tenfold access, with regard to reactive epoxy groups, and to the reactive amino groups are added further unsaturated compounds of the formula $H(R_1)-C=CR_2-X$, whereby $R_1$, $R_2$ is H or lower alkyl and X is a radical selected from CN, $COOR_1$, $CONR_1R_2$.

On a similar principle are based the curing agents according to WO 93/21250: adducts of glycidyl ethers on the basis of alkoxylated bisphenol-A with amines are, after being solved in water, further adducted with epoxy resins to increase the H-equivalent weight. Films formed from aqueous dispersions of epoxy resins and said curing agents have clear and hard surfaces. With regard to cure speed, their dependency of the scheduled quantity on pot life and overall surface properties does not meet practical requirements.

WO-A1-02/074832 discloses adducts of amines with polyalkylene glycol monoglycidyl ethers which can be used as curing agents in curable compositions comprising epoxide compounds. The adducts of amines with polyalkylene glycol monoglycidyl ethers demonstrate low viscosities and a rapid curing speed with epoxy resins.

As experiences showed, aqueous epoxy resin compositions with a widely and as requested adjustable pot life and fast dryness to handle in many application areas, especially were multilayered films are required, are requested from users.

The aim of the present invention was therefore to provide aqueous epoxy resin compositions having a pot life being both independent from the scheduled quantity and having a recognizable end, which is noticeable from an explicit increase of viscosity.

It has now been found, surprisingly, that in the presence of compounds of general formula (I)

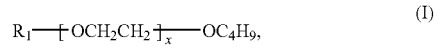

whereby
$R_1 =$ —H or —$C_4H_9$, and x=1, 2, 3 or 4,
for aqueous epoxy resin compositions an adjustable recognizable end of pot life during application can be achieved.

Under aqueous epoxy resin compositions are understood curable mixtures based on epoxy resins and amino functionalized curing agents, whereby at least one of the reaction partners is soluble or dispersed in water. Commonly the curing agent is selected from certain adducts of polyamines or polyaminoamides, which are solved in water and which are capable of emulgating liquid epoxy resins. The epoxy resins are usually dispersions containing emulgators. Aqueous further means that the inventive compositions are free from further organic solvents.

A recognizable end of pot life means that a distinct rise of viscosity indicates the end of processability, which leads to short-term gelation of the binder.

Hereby processability increases significantly, as the product can not, contrary to binder systems without a recognizable pot life end, be applicated any further after the end of usability has been reached.

A first object of the invention are
curable, aqueous epoxy resin compositions, comprising
a) an epoxy compound,
b) an aminic curing agent which is an aqueous solution of a product from the reaction between i) an adduct between a polyamine and a liquid glycidyl ether which is not a glycidyl ether of a polyalkylene glycol, and ii) an epoxidized polyalkylene glycol, and
c) from 0.5 to 15 wt.-%, based on the sum of the components b) and c), of a compound of the general formula (I)

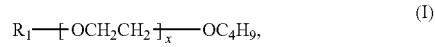

whereby
$R_1 =$ —H or —$C_4H_9$, and x=1, 2, 3 or 4.

Compounds of formula (I) are commercially available. The butyl groups are preferably linear n-butyl.

Preferred compounds of formula (I) are those, wherein
$R_1 =$ —H, and
x=1, 2, or 3.

An especially preferred compound of general formula (I) is diethyleneglykol monobutylether as a compound of formula (I), wherein $R_1 =$ —H and x=2.

By adding one of those special compounds in the form of component c) it is possible to recognize the end of the pot life, even for those binders, for which this was not possible so far. By way of the fast increase of viscosity at the end of pot life it is not possible anymore for the fabricator/user to applicate the product beyond the usability of the system. This property increases the processing security in a significant way.

The additives can be added before hand to the curing agent, to the epoxy resin, or during processing of the binder system. Preferred is the addition to the curing agent.

The component c) is used in an amount of from 0.5 to 15% by weight, preferably of from 1 to 10% per weight, more preferably of from 2 to 8% per weight, especially preferably from 3 to 6% per weight, based on the sum of components b) and c), as said range has been found to be especially suitable. In the presence of, for example, 5% per weight based on the sum of components b) and c), or accordingly a weight ratio between b) to c) of 95:5, the inventive compounds allow to achieve a pot life representative of actual service of from approximately 2.5 to 5 hours, and, after expiration of this term, a fast increase of viscosity up to gelation indicates clearly the end of pot life.

The curable, aqueous epoxy resin composition according to the invention comprises an aminic curing agent which is an aqueous solution of a product from the reaction between
  i) an adduct between a polyamine and a liquid glycidyl ether which is not a glycidyl ether of a polyalkylene glycol and
  ii) an epoxidized polyalkylene glycol.

The polyamine used for the preparation of the aminic curing agent can be any amine which has at least 2 amino groups per molecule. Suitable examples of polyamines are: polyethylenepolyamines, such as diethylenetriamine, triethylenetetramine, tetraethylenepentamine, etc.; polypropylenepolyamines, such as dipropylenetriamine, tripropylenetetramine and the polyamines obtained by cyanoethylation of polyamines, in particular of ethylenediamine, and subsequent complete or partial hydrogenation; aliphatic amines, such as diaminoethane, diaminopropane, neopentanediamine, diaminobutane, hexamethylenediamine, 2,2,4 (2,4,4)-trimethylhexamethylene-1,6-diamine; cycloaliphatic polyamines, such as isophoronediamine, diaminocyclohexane, norbornanediamine, 3(4),8(9)-bis(aminomethyl)tricyclo [5,2,1,0] decane, (TCD-diamine), 1,3-bis(aminomethyl)cyclohexane, bis(aminomethylcyclohexyl)methane; heterocyclic polyamines, such as N-aminoethylpiperazine, 1,4-bis(aminopropyl)piperazine; aromatic amines, such as, for example, diaminodiphenylmethane; polyaminoamides optionally containing imidazoline groups, such as, for example, products of the condensation of monomeric or dimeric fatty acids with polyethylenepolyamines.

Preferably, ethylenediamine is used. Further preferred are mixtures of at least two of the above-mentioned polyamines.

The polyamine is reacted with a liquid glycidyl ether which is not a glycidyl ether of a polyalkylene glycol to form the adduct i). In principle any glycidly ether can be used which is liquid at 25° C. Preferred liquid glycidyl ether are selected from the group consisting of glycidyl compounds based on bisphenol A and/or bisphenol F.

In order to obtain the aminic curing agent used in the curable, aqueous epoxy resin composition according to the present invention the reaction product (adduct i)) between the polyamine and the liquid glycidyl ether which is not a glycidyl ether of a polyalkylene glycol is further reacted with an epoxidized polyalkylene glycol ii). Epoxidized polyalkylene glycol can be prepared by a process which is generally known-addition of epichlorohydrin onto the polyalkylene glycol at 30° C.-60° C. in the presence of tetrafluoroboric acid, ring closure in the presence of aqueous sodium hydroxide solution, and subsequent separation of the aqueous sodium chloride solution. The molar ratio between polyalkylene glycol and epichlorohydrin is preferably 1:2. It is possible to employ ethylene glycols and propylene glycols, starting from the monomers, i.e. ethylene glycol and propylene glycol, up to polymers thereof having a mean molecular weight of about 3000. Preference is given to polyalkylene glycols having a mean molecular weight of from 200 to 2000.

In a preferred embodiment the aminic curing agent used in the curable, aqueous epoxy resin composition according to the present invention is further reacted with one or more reactive diluents selected from the group consisting of phenylglycidyl ether, cresylglycidyl ether, p-tert-butylphenylglycidyl ether, butyl glycidylether, $C_{12}$-$C_{14}$-alcohol glycidylether, butyldiglycidylether, hexane diglycidyl ether, cyclohexane dimethyl diglycidylether. According to a particular preferred embodiment of the present invention the aminic curing agent is further reacted with cyclohexane dimethyl diglycidylether and subsequently reacted with cresyl glycidylether.

According to a further preferred embodiment of the present invention the aminic curing agent is additionally reacted with a carboxylic acid, preferably a $C_2$-$C_{10}$-aliphatic carboxylic acid. Preferably the aminic curing agent is further reacted with propionic acid.

The reaction product is then solved in water. The water content lies, dependent from the curing agent, between 20% and 60%. The curing agents are preferably used in approximately equivalent amounts, that means one active amino hydrogen per epoxy group. Dependent from the intended purpose nevertheless an excess or insufficient amount of curing agent can be used, however in practice the excess or insufficient amount does not exceed 25% from the amount needed for equivalence.

The epoxy compounds a) used according to the invention are commercially available products having on average more than one epoxy group per molecule that are derived from mono- or/and poly-valent, mono- or/and poly-nuclear phenols, especially bisphenols, and also novolaks. A comprehensive list of such di- or poly-phenols can be found in the handbook "Epoxidverbindungen and Epoxidharze" by A. M. Paquin, Springer Verlag, Berlin, 1958, Chapter IV, and Lee & Neville "Handbook of Epoxy Resins", 1967, Chapter 2.

It is also possible to use mixtures of two or more of the epoxy resins.

It is preferable to use mixtures of a glycidyl compound based on bisphenol A (4,4'-dihydroxy-diphenylpropane-2,2), bisphenol F (4,4'-dihydroxy-diphenylmethane) or a novolac with a so-called reactive diluent, e.g. monoglycidyl ethers of phenols or mono- or difunctional aliphatic or cycloaliphatic alcohols. It is also possible to use mixtures of two or more of the epoxy resins with two or more different reactive diluents.

Examples of such reactive diluents are e.g. phenyl glycidylether, cresyl glycidylether, p-tert-butyl phenyl glycidylether, butyl glycidylether, $C_{12}$-$C_{14}$-alcohol glycidylether, butane diglycidylether, hexane diglycidylether, cyclohexane dimethyl diglycidylether or glycidylether on the basis of polyethylene- or polypropylene glycoles. If required, such reactive diluents can be used for further reducing viscosity of the epoxy resins.

According to the invention as component a) are preferably used epoxy compounds having on average more than one epoxy group per molecule in aqueous dispersed form. Suitable aqueous dispersions are commercially available, e.g. Araldite® PY 756 W 67. This is a against crystallisation stabilized and emulgated epoxy resin having an epoxy equivalent of approximately 282.

The curable compositions can optionally contain further conventional additives, with the exception of organic solvents, selected for example from flow control additives, anti-foaming agents, anti-sag agents, pigments, reinforcing agents, fillers, elastomers, stabilizers, extenders, plasticizers, flame retardants, accelerators, colorants, fibrous substances, thixotropic agents, and anti-corrosive pigments.

The inventive compositions are suitable, especially in view of the recognizable end of pot life, for the preparation of curable dispersion in many application fields. A further object of the invention is accordingly the use of an inventive curable composition for coating, adhesive, as flooring, casting, tooling or encapsulating, to name a few applications.

A further object of the instant invention are the cured products obtained after a full cure of an inventive composition.

A further object of the instant invention is the use of a compound of general formula (I)

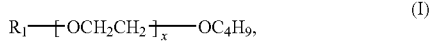

$$R_1 \!-\!\!\left[\mathrm{OCH_2CH_2}\right]_{\!x}\!\!-\!\mathrm{OC_4H_9},\qquad (I)$$

whereby
$R_1$=—H or $C_4H_9$, and x=1, 2, 3 or 4, preferably x=1, 2 or 3, especially preferably x=2, as an additive for curable aqueous epoxy resin compositions comprising at least one epoxy resin and at least one aminic curing agent, for the purpose as an aid to adjust the pot life of said composition.

EXAMPLES

In the following experimental section are in each case added to 95 parts per weight of an aqueous curing agent for epoxy resins (a modified adduct of a polyamine, 40% per weight in water) 5 parts per weight of a different alkylene glycol alkylether. Each of the such modified curing agents was added to a commercial epoxy resin (dispersed epoxy resin, 67% per weight in water, Araldite® GY 756 W 67) in equivalent amounts. The viscosity of the obtained binders are measured isochronous with a Brookfield-Viskosimeter. Values given are in "poise" (P) and have been measured each at a different rotation speed (5/10/20).

a) Preparation of the Adduct:
10 mol (600 g) ethylenediamine is placed in a vessel and heated to 60° C. Than 0.918 mol equivalents of a bisphenol A resin (170 g, epoxy equivalent weight 183-189) is added slowly so that the temperature does not raise above 80° C. The reaction mixture is subsequently stirred for a further 30 minutes. The product is than heated to 120° C., vacuum is carefully applied and reduced to 1 mbar at which excess of amine is distilled off. Distillate: 545 g, yield of adduct: ca. 225 g.

b) Preparation of the Hardener:
225 g of said adduct is placed in a vessel. 51 g of a glycidyiized polyethylene glycol 1000 is melted and added at ca. 120° C. slowly within 30 min. The reaction mixture is subsequently stirred for a further 60 minutes at 120° C. to 140° C. Subsequently the mixture is allowed to cool down to ca. 90° C. At this temperature is now added 600 g water under fast stirring. The temperature is subsequently adjusted to 60° C. 51 g of cyclohexane dimethyldiglycidylether (Araldite® DY-C, Fa. Huntsman) is now added within ca. 15 min at ca. 60° C. under stirring. The reaction mixture is subsequently stirred for a further 15 min and followed by adding 51 g cresylglycidylether (Araldite® DY-K, Fa. Huntsman) within ca. 15 min under stirring. The reaction mixture is subsequently stirred for a further 15 min. Finally 22 g of propionic acid is added under fast stirring between 50° C. and 60° C. The reaction mixture is subsequently stirred for a further 30 minutes. The product can be discharged over filter at 50° C. to 60° C.

Characteristics: amine number: 90-100 mg KOH/g; viscosity/25° C.: 13000-18000 mPa·s.

95 g of the obtained hardener are homogenized with 5 g of the following additives. The results can be seen in the following tables.

TABLE 1

| A/C | 0 h (at once) | | | 0.5 h | | | 1 h | | | 1.5 h | | | 2 h | | |
|---|---|---|---|---|---|---|---|---|---|---|---|---|---|---|---|
| | 5 | 10 | 20 | 5 | 10 | 20 | 5 | 10 | 20 | 5 | 10 | 20 | 5 | 10 | 20 |
| 1 | 31 | 29 | 29 | 23 | 23 | 22 | 12 | 11 | 11 | 9 | 8 | 8 | 10 | 8 | 8 |
| 2 | 31 | 30 | 30 | 42 | 40 | 40 | 48 | 46 | 44 | 56 | 53 | 50 | 94 | 82 | 72 |
| 3 | 29 | 27 | 27 | 36 | 36 | 35 | 40 | 40 | 39 | 44 | 47 | 44 | 66 | 59 | 53 |
| 4 | 32 | 30 | 30 | 35 | 35 | 35 | 38 | 38 | 38 | 44 | 44 | 42 | 58 | 56 | 48 |
| 5 | 33 | 32 | 33 | 30 | 30 | 28 | 21 | 22 | 22 | 22 | 22 | 21 | 20 | 19 | 19 |
| V6 | 33 | 32 | 31 | 28 | 28 | 27 | 20 | 21 | 21 | 14 | 13 | 13 | 12 | 12 | 12 |
| V7 | 32 | 31 | 31 | 26 | 27 | 26 | 20 | 19 | 20 | 14 | 14 | 14 | 14 | 12 | 12 |
| V8 | 29 | 29 | 28 | 26 | 26 | 26 | 20 | 20 | 20 | 13 | 14 | 14 | 14 | 11 | 11 |
| V9 | 30 | 29 | 28 | 28 | 28 | 24 | 24 | 24 | 24 | 19 | 20 | 19 | 20 | 20 | 20 |

| A/C*) | 2.5 h | | | 3 h | | | 4 h | | | 5 h | | |
|---|---|---|---|---|---|---|---|---|---|---|---|---|
| | 5 | 10 | 20 | 5 | 10 | 20 | 5 | 10 | 20 | 5 | 10 | 20 |
| 1 | 9 | 9 | 10 | 11 | 12 | 12 | 18 | 17 | 16 | 24 | 23 | 21 |
| 2 | 164 | 132 | n.m. | 280 | n.m. | n.m. | — | — | — | — | — | — |
| 3 | 284 | n.m. | n.m. | — | — | — | — | — | — | — | — | — |
| 4 | 96 | 83 | 69 | 168 | 134 | n.m. | — | — | — | — | — | — |
| 5 | 24 | 24 | 24 | 40 | 48 | 52 | 96 | 80 | 65 | 189 | 142 | n.m. |
| V6 | 14 | 14 | 14 | 18 | 19 | 18 | 34 | 32 | 28 | 55 | 47 | 40 |
| V7 | 14 | 14 | 14 | 15 | 15 | 15 | 24 | 24 | 21 | 36 | 33 | 29 |
| V8 | 14 | 14 | 13 | 16 | 16 | 17 | 36 | 32 | 27 | 55 | 49 | 38 |
| V9 | 26 | 24 | 22 | 32 | 30 | 28 | 58 | 51 | 44 | 96 | 78 | 61 |

*)h = hours, D = rotary speed; A = additive, C = comparative additive: 1 = without (zero value), 2 = ethylene glycol monobutyl ether, 3 = diethylene glycol monobutyl ether, 4 = triethylene glycol monobutyl ether, 5 = diethylene glycol dibutyl ether, V6 = diethylene glycol monomethyl ether, V7 = tetraethylene glycol dimethyl ether, V8 = ethylene glycol monomethyl ether, V9 = diethylene glycol diethyl ether, n.m. = not measurable Discussion of Results:

As it appears from the table, the aqueous curing agents modified by using one of the inventive alkylene glycol alkyl ethers 2 to 5 show a well recognizable end of pot life in a user friendly, suitable time of from 2.5 to 4 hours.

The effect of the highly increase of viscosity is in evidence from comparison with the zero value. Among the alkyl glycol alkyl ethers showing said effect are concerned the inventive alkyl glycol butyl ethers. Especially diethylene glycol monobutyl ether (3) shows a strong increase in viscosity.

Among the tested non-inventive alkyl glycol alkyl ethers V6 to V9 said effect is missing, as the viscosity is only slowly increasing. An end of pot life is within the given time frame is not recognizable.

The invention claimed is:

1. Curable, aqueous epoxy resin composition, comprising
    a) an epoxy compound,
    b) an aminic curing agent which is an aqueous solution of a product from the reaction between i) an adduct between a polyamine and a liquid glycidyl ether consisting of glycidyl compounds based on bisphenol A and/or bisphenol F, and ii) an epoxidized polyalkylene glycol, and
    c) from 0.5 to 15 wt. %, based on the sum of the components b) and c), of a compound of the general formula (I)

(I)

whereby
$R_1$=—H or —$C_4H_9$, and x=1, 2, 3 or 4.

2. A composition according to claim 1, wherein component c) is used in an amount of from 3 to 6% per weight, based on the sum of components b) and c).

3. A composition according to claim 1 wherein component a) has on average more than one epoxy group per molecule.

4. A composition according to claim 1 wherein component a) is used in aqueous dispersed form.

5. A composition according to claim 1 wherein component a) is mixture of a glycidyl compound based on bisphenol A, bisphenol F or a novolac with a reactive diluent.

6. A composition according to claim 1 wherein component c) is a compound of formula (I), wherein $R_1$=—H, and x=1, 2, or 3.

7. A composition according to claim 6, wherein component c) is diethylene glycol monobutyl ether.

8. Cured product, obtained from full cure of a composition according to claim 1.

9. A method for adjusting the pot life of an aqueous epoxy resin composition comprising adding to the composition a compound of the general formula (I)

(I)

whereby
$R_1$=—H or —$C_4H_9$, and x=1, 2, 3 or 4 and wherein the composition includes
    a) an epoxy compound, and
    b) an aminic curing agent which is an aqueous solution of a product from the reaction between i) an adduct between a polyamine and a liquid glycidyl ether consisting of glycidyl compounds based on bisphenol A and/or bisphenol F, and ii) an epoxidized polyalkylene glycol.

* * * * *